United States Patent [19]

Benvenuti et al.

[11] Patent Number: 4,864,816

[45] Date of Patent: Sep. 12, 1989

[54] REGULATION SYSTEM FOR DOUBLE-SHAFT GAS TURBINES

[75] Inventors: Erio Benvenuti, Florence; Bruno Innocenti, Castelfiorentino, both of Italy

[73] Assignee: Nuovopignone Industrie Meccaniche e Fonderia S.p.A., Florence, Italy

[21] Appl. No.: 157,286

[22] Filed: Feb. 17, 1988

[30] Foreign Application Priority Data

Feb. 20, 1987 [IT] Italy .............................. 19432 A/87

[51] Int. Cl.$^4$ ............................. F02C 9/20; F02C 9/54
[52] U.S. Cl. .................................. 60/39.161; 60/39.25; 60/39.27
[58] Field of Search ................ 60/39.161, 39.25, 39.27

[56] References Cited

U.S. PATENT DOCUMENTS

| | | | |
|---|---|---|---|
| 3,255,586 | 1/1966 | Hennig et al. | 60/39.27 |
| 3,686,860 | 8/1972 | White | 60/39.161 |
| 3,899,886 | 8/1975 | Swick | 60/39.25 |
| 3,981,140 | 9/1976 | Lunsford et al. | 60/39.03 |
| 4,173,119 | 11/1979 | Greune et al. | 60/39.161 |
| 4,266,401 | 5/1981 | Sumegi et al. | 60/39.161 |
| 4,539,810 | 9/1985 | Watanabe | 60/39.161 |

Primary Examiner—Louis J. Casaregola
Attorney, Agent, or Firm—Morgan & Finnegan

[57] ABSTRACT

A regulating system for regulating a double-shaft gas turbine, wherein simultaneously: the fuel feed electro-valve is governed by a signal proportional to the difference between the number of revolutions per minute of the power turbine and a reference value; the movable nozzles of the power turbine are governed by a signal either proportional to the difference between the number of revolutions per minute of the compressor and a reference value, or proportional to the difference between the temperature of the exhaust gases and a relevant reference value; and the movable stator-blades of the compressor are governed by a signal proportional to the ratio between the revolutions per minute of the compressor to the square root of the ratio of the absolute ambient temperature to an absolute reference or design temperature.

6 Claims, No Drawings

REGULATION SYSTEM FOR DOUBLE-SHAFT GAS TURBINES

The present invention relates to a regulation system which makes possible a double-shaft gas turbine with a high cycle compression ratio, which is endowed with a wide power regulation range inside which high efficiencies are maintained, also independently from ambient temperature.

From the prior state of the art, several types of systems for double-shaft gas turbine regulation are known, one of which is initially based on the regulation of fuel injection and of the orientation of the movable nozzles of the power turbine until the minimum revolution speed at which the compressor normally operates, is reached; and subsequently, for a further reduction of power fed by the gas turbine, the orientation is controlled of one row only of movable stator-blades, with the number of revolutions per minute, i.e., the revolution speed, of said compressor being kept constant.

The above said regulation system makes it possible for the efficiency of the gas turbine to be maintained substantially constant within a wide range of variation of the power of the same turbine.

Said system is however efficient only when it is applied to gas turbines having medium values of compression ratio, i.e., values of the order of 7 to 8 and which are inherently more flexible from the view point of the preservation of efficiency with varying loads (power). In the field of the high compression ratios, of the order of 14 to 15, and therefore with higher cycle efficiencies, on the contrary an intrinsic limitation exists in the range of variation of power inside which said high efficiencies are accomplished, because the efficiency, which is maximum at design point, decreases, when the operating conditions become different from said design point, faster than it would do in case of gas turbines with lower compression ratios.

The purpose of the present invention is precisely to obviate the above said drawback, and therefore to provide a regulating system for a double-shaft gas turbine, which makes it possible for a higher efficiency to be obtained by means of higher compression ratios, with the efficiency loss being simultaneously minimized within a wide range of variation of power, and that also independently from the ambient temperature.

Such purpose is substantially achieved by making the orientation of the movable stator-blades of the compressor vary, together with the fuel injection and the orientation of the movable nozzles of the power turbine, as a linear function of the revolution speed, i.e., the number of revolutions per minute, of said compressor, continuously corrected on the basis of the ambient temperature; more specifically, the revolution speed of the compressor is measured, and compensated for, relatively to ambient temperature, according to the well-known formula:

$$N_c = \frac{N}{\sqrt{T/T_r}}$$

wherein:

$N_c$ is the revolutions speed, or revolutions per minute, of the compressor, corrected according to the absolute ambient temperature, N is the measured revolution speed, i.e., revolutions per minute, of the compressor, T is the absolute ambient temperature, and $T_r$ is an absolute reference or design temperature.

The invention is now better explained by referring to the hereto attached drawing, which depicts a preferred form of practical embodiment, given for only illustrative and non-limitative purposes, because technical and structural variants may be supplied at any time, without departing from the purview of the present invention.

In said drawing, the figure shows a diagram of the regulating system for a double-shaft gas turbine, having a high compression ratio, according to the invention.

Referring to said figure, by the reference numeral 1 the compressor of a double-shaft gas turbine is indicated, with the two shafts of the turbine being respectively indicated by the reference numerals 2 and 3, which compressor compresses air intaken through the filter 4, and delivers it into the combustion chamber 5, to which also the fuel comes, through the regulating electrovalve 6. The flue gases expand first inside the turbine 7, which drives the compressor 1 through said shaft 2, and subsequently inside the power turbine 8, which drives an operating machine, or a generator 9, and are then discharged to atmosphere through the exhaust 10.

The revolution speed, or number of revolutions per minute of the shaft 3 of the power turbine 8 detected by the sensor 11 is compared inside the comparator unit 12 to a reference or set value, 13, and the output 12' from the comparator unit 12 is used in order to drive the fuel electrovalve 6. Simultaneously to the above, the number of revolutions per minute N of the shaft 2 of the compressor 1, detected by the sensor 14, or the temperature of the gases at exhaust 10, detected by the sensor 15, are compared to set values inside the comparator unit 16, which governs, by means of its output 17, the movable nozzles 18 of the power turbine 8.

Finally, the number of revolutions per minute N detected by the said sensor 14 is also input, together with the value of the ambient temperature T detected by means of the sensor 19, to a unit 20 which performs the compensation of said number of revolutions per minute N relatively to said temperature, in order to obtain a signal equal to the corrected number of revolutions per minute $$N_c = \frac{N}{\sqrt{T/T_r}}$$

by means of which the movable stator-blades 21 of compressor 1 are governed.

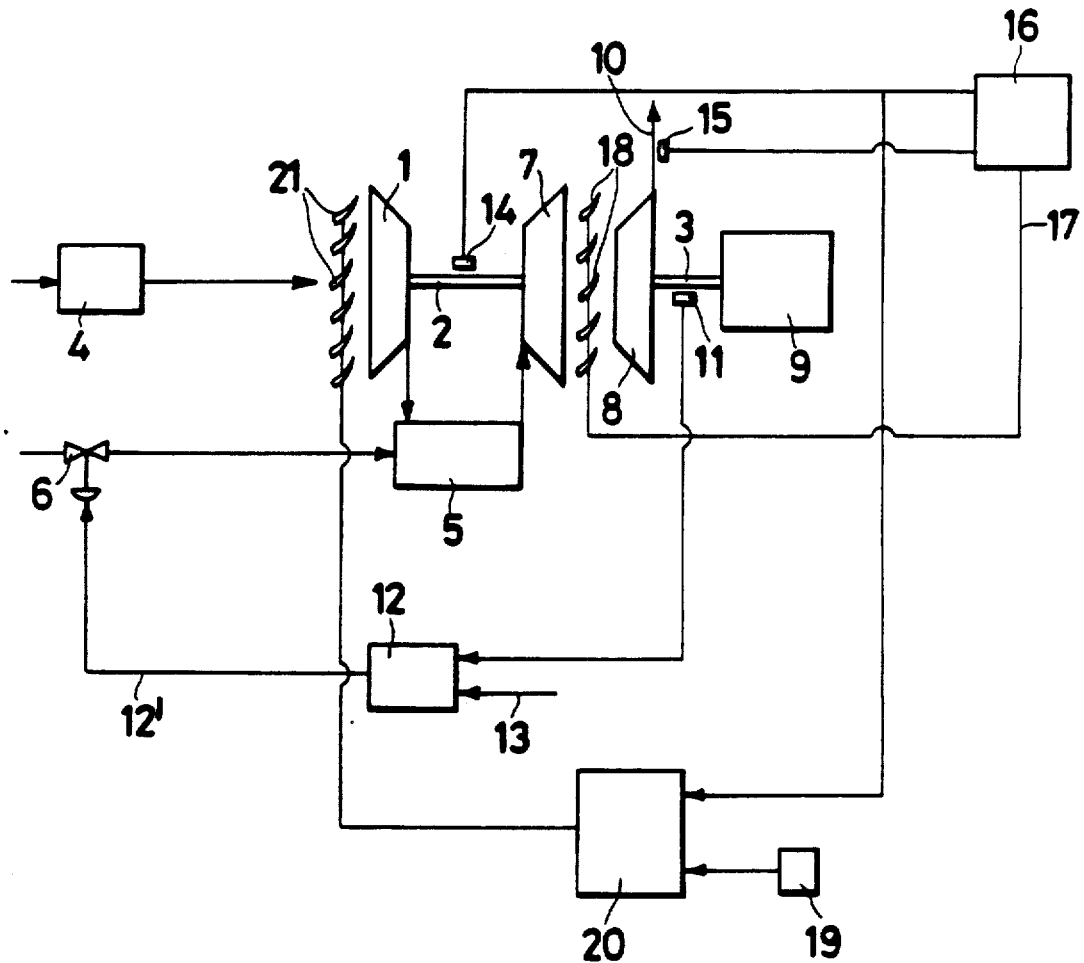

We claim:

1. A regulating system to maintain a constant high efficiency for a double-shaft gas turbine, having a high-compression ratio compressor provided with a plurality of rows of movable stator blades, with a power turbine equipped with movable nozzles, a combustion chamber to which fuel is delivered through a regulating electrovalue, and designed for a specific design ambient temperature, said regulating system comprising:

a. means for detecting the number of revolutions per minute of said power turbine and for generating a first signal representative of the number of revolutions per minute of said power turbine;

b. comparative means for accepting said first signal and producing a first output signal when said first signal is compared to a first reference value;
c. means for accepting said first output signal for varying said regulating electro-valve;
d. means for detecting the number of revolutions per minute of said high-compression-ratio compressor and for generating a second signal representative of the number of revolutions per minute of said high-compression-ratio compressor;
e. comparative means for accepting said second signal and for producing a second output signal when said second signal is compared to a second reference value;
f. means for accepting said second output signal for governing said movable nozzles of said power turbine;
g. comparative means for accepting said second signal and for producing a third output signal when said second signal is compensated for relative to a third reference value; and
h. means for accepting said third output signal for governing said movable stator-blades of said high-compression ratio compressor.

2. A regulating system according to claim 1, wherein said third reference value is ambient temperature.

3. A regulating system according to claim 2, wherein said third output signal is said second signal divided by the square root of the ratio of said ambient temperature to said design ambient temperature.

4. A regulating system to maintain a constant high efficiency for a double-shaft gas turbine, having a high-compression ratio compressor provided with a plurality of rows of movable stator blades, with a power turbine equipped with movable nozzles, a combustion chamber to which fuel is delivered through a regulating electro-valve, and designed for a specific design ambient temperature, said regulating system comprising:

a. means for detecting the number of revolutions per minute of said power turbine and for generating a first signal representative of the number of revolutions per minute of said power turbine;
b. comparative means for accepting said first signal and producing a first output signal when said first signal is compared to a first reference value;
c. means for accepting said first output signal for varying said regulating electro-valve;
d. means for detecting the temperature of the exhaust gases of said power turbine and for generating a second signal representative of the temperature of the exhaust gases of said power turbine;
e. comparative means for accepting said second signal and for producing a second output signal when said second signal is compared to a second reference value;
f. means for accepting said second output signal for governing said movable nozzles of said power turbine;
g. means for detecting the number of revolutions per minute of said high-compression ratio compressor and for generating a third signal representative of the number of revolutions per minute of said high-compression ratio compressor;
h. comparative means for accepting said third signal and producing a third output signal when said third signal is compensated for relative to a third reference value; and
i. means for accepting said third output signal for governing said movable stator-blades of said high-compression ratio compressor.

5. A regulating system according to claim 4, wherein said third reference value is ambient temperature.

6. A regulating system according to claim 5, wherein said third output signal is said third signal divided by the square root of the ratio of said ambient temperature to said design ambient temperature.

* * * * *

UNITED STATES PATENT AND TRADEMARK OFFICE
CERTIFICATE OF CORRECTION

PATENT NO. : 4,864,816

DATED : September 12, 1989

INVENTOR(S) : Benvenuti, et al

It is certified that error appears in the above-identified patent and that said Letters Patent is hereby corrected as shown below:

The title page should be deleted to appear as per attached title page.

The sheet of drawing consisting of Fig. 1, should be added as per attached sheet.

Signed and Sealed this

Twelfth Day of February, 1991

*Attest:*

HARRY F. MANBECK, JR.

*Attesting Officer*    Commissioner of Patents and Trademarks

United States Patent [19]

Benvenuti et al.

[11] Patent Number: 4,864,816
[45] Date of Patent: Sep. 12, 1989

[54] REGULATION SYSTEM FOR DOUBLE-SHAFT GAS TURBINES

[75] Inventors: Erio Benvenuti, Florence; Bruno Innocenti, Castelfiorentino, both of Italy

[73] Assignee: Nuovopignone Industrie Meccaniche e Fonderia S.p.A., Florence, Italy

[21] Appl. No.: 157,286

[22] Filed: Feb. 17, 1988

[30] Foreign Application Priority Data

Feb. 20, 1987 [IT] Italy ............... 19432 A/87

[51] Int. Cl.⁴ ............... F02C 9/20; F02C 9/54
[52] U.S. Cl. ............... 60/39.161; 60/39.25; 60/39.27
[58] Field of Search ............... 60/39.161, 39.25, 39.27

[56] References Cited

U.S. PATENT DOCUMENTS

| | | | |
|---|---|---|---|
| 3,255,586 | 1/1966 | Hennig et al. | 60/39.27 |
| 3,686,860 | 8/1972 | White | 60/39.161 |
| 3,899,886 | 8/1975 | Swick | 60/39.25 |
| 3,981,140 | 9/1976 | Lunsford et al. | 60/39.03 |
| 4,173,119 | 11/1979 | Greune et al. | 60/39.161 |
| 4,266,401 | 5/1981 | Sumegi et al. | 60/39.161 |
| 4,539,810 | 9/1985 | Watanabe | 60/39.161 |

*Primary Examiner*—Louis J. Casaregola
*Attorney, Agent, or Firm*—Morgan & Finnegan

[57] ABSTRACT

A regulating system for regulating a double-shaft gas turbine, wherein simultaneously: the fuel feed electrovalve is governed by a signal proportional to the difference between the number of revolutions per minute of the power turbine and a reference value; the movable nozzles of the power turbine are governed by a signal either proportional to the difference between the number of revolutions per minute of the compressor and a reference value, or proportional to the difference between the temperature of the exhaust gases and a relevant reference value; and the movable stator-blades of the compressor are governed by a signal proportional to the ratio between the revolutions per minute of the compressor to the square root of the ratio of the absolute ambient temperature to an absolute reference or design temperature.

6 Claims, 1 Drawing Sheet

UNITED STATES PATENT AND TRADEMARK OFFICE
CERTIFICATE OF CORRECTION

PATENT NO. : 4,864,816

DATED : September 12, 1989

INVENTOR(S) : Benvenuti, et al.

It is certified that error appears in the above-identified patent and that said Letters Patent is hereby corrected as shown below:

Please include the drawing as follows: